Aug. 2, 1927.
G. H. ELWELL
1,637,521
SHANK AND SOCKET FASTENING DEVICE
Filed Nov. 21, 1921
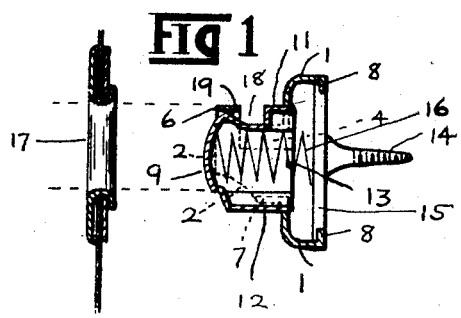
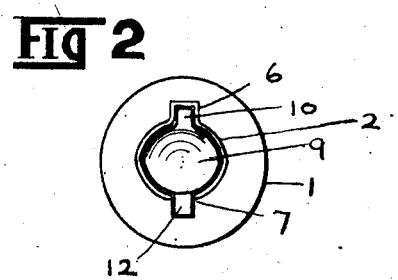
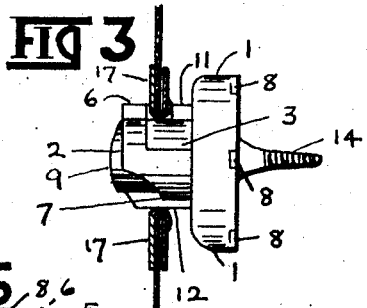
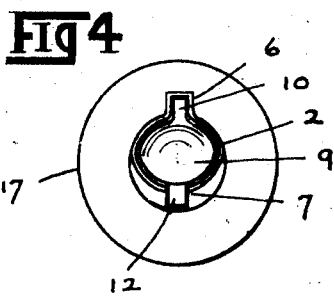
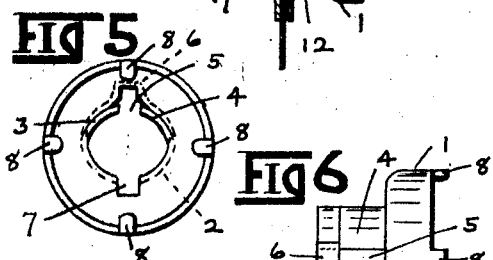
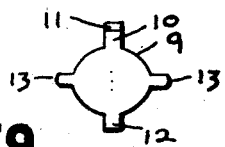
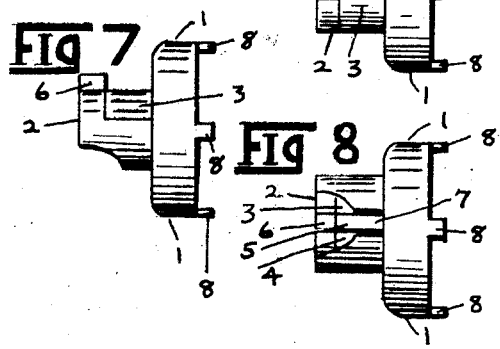
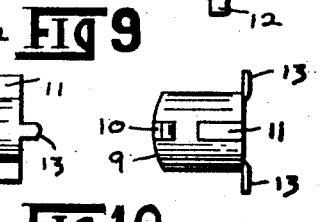
WITNESSES:
Dorothy G. Elwell
Ruth Elwell
George Henry Elwell
INVENTOR Patented Aug. 2, 1927.

1,637,521

UNITED STATES PATENT OFFICE.

GEORGE HENRY ELWELL, OF CLEVELAND, OHIO, ASSIGNOR TO CARR FASTENER COMPANY, OF CAMBRIDGE, MASSACHUSETTS, A CORPORATION OF MAINE.

SHANK AND SOCKET FASTENING DEVICE.

Application filed November 21, 1921. Serial No. 516,818.

This invention aims to provide improvements in stud and socket devices.

In the drawings, which illustrate a preferred embodiment of my invention:—

Figure 1 is a cross-sectional view of the device showing the grommet detached;

Fig. 2 is a front elevation of the stud member;

Fig. 3 is a side view of the device showing the grommet in cross-section;

Fig. 4 is a front elevation of the preferred form of device;

Fig. 5 is a rear view of the body part of the stud member;

Fig. 6 is a plan view of the part shown in Fig. 5;

Fig. 7 is a side elevation of the part shown in Figs. 5 and 6;

Fig. 8 is a bottom view of the part shown in Figs. 5, 6 and 7;

Fig. 9 includes front and rear elevations, respectively, of the button part of the stud member; and Fig. 10 includes a side elevation and a plan view, respectively, of the button member.

Referring to the preferred form of my invention, I have shown a stud member preferably pressed from a single sheet of metal thereby to present a base portion 1 and a shank part 2; the shank part being first formed generally cylindrical with an open end and thereafter formed somewhat elliptical by pressing inwardly two winglike parts 3 and 4 located in the upper portion of the shank portion, thereby to provide a slot 5, as best illustrated in Fig. 6.

At the outer end of the shank part 2, I have provided a saddle-shaped top 6, the purposes of which are more fully hereinafter described. The shank part 2 is also provided with a bottom slot 7, which extends from the outer end of the shank portion into the base 1 in the same manner as the slot 5, thereby to permit insertion in the shank portion of a button 9, also formed generally elliptical in cross-section. The button presents saddle-shaped parts 10 and 11 and a socket-engaging part 12 generally rectangular in cross-section. Lugs 13 are provided at the inner end of the button 9, and thus extend outwardly therefrom (Figs. 9 and 10) to limit the forward movement thereof relative to the shank part 2. These lugs 13 provide stops which abut against the base portion 1 of the stud and limit the movement of the button in one direction relative to the shank 2.

The preferred form of fastening means for the stud member includes an attaching screw 14 secured to a plate 15 which in turn is held in place relative to the base 1 of the stud member by a plurality of prongs 8 formed integral with the base. The plate 15 also serves as a means for holding the spring 16 and the button 9 in assembled relation to the shank member.

The preferred form of socket, as illustrated, is a grommet 17, which may be secured to the stud member by engaging the shank 2 of the stud member in the aperture in the grommet; thus the walls of the grommet engage the saddle top 6 and the inclined surface of the socket-engaging part 12. Pressure exerted between the stud member and the grommet, causes the button to be moved inwardly against the pressure of the spring, thereby permitting the grommet to be positioned opposite the recess 18 provided in the shank 2 between the saddle-tops 6 and 11, as best illustrated in Fig. 1. When the grommet is opposite the recess 18, the button is released and urged forward again by the spring 16, thereby permitting the socket-engaging part 12 to enter the grommet and shift the grommet into the recess 18, thereby locking the grommet and stud together, as best illustrated in Fig. 3.

Separation of the grommet and stud is effected by urging the button 9 toward the base 1, so that the sloping shoulder 19 on the saddle-top 10 may lift the grommet while the socket-engaging part is moved out of engagement with the grommet thereby permitting separation of the fastener by relative tipping of one part relative to the other.

By omitting the saddle-top 11, the shank 2 may accommodate two grommets or one grommet, as desired.

While I have shown and described a preferred form of one embodiment of my invention, it will be understood that changes may be made, involving omission, substitution, alteration and reversal of parts, and even changes in the mode of operation, without departing from the scope of my invention, which is best defined in the following claims.

What I claim is:

1. A fastener comprising, in combination, a socket presenting a stud-receiving aperture surrounded by a wall of fixed dimensions, a stud having two parts axially movable relative to each other to permit engagement and disengagement between the stud and the socket, one of said parts provided with fixed means engageable with the wall surrounding the stud-receiving aperture, while said other part provides rigid means for preventing seperation of the stud and socket until axially shifted relative to said part which engages said socket.

2. A fastener comprising, in combination, a socket presenting a stud-receiving aperture surrounded by a wall of fixed dimensions, a stud having two parts axially movable relative to each other to permit engagement and disengagement between the stud and the socket, one of said parts having a groove in which the wall surrounding the stud-receiving aperture may engage, said other part providing means for interlocking the wall and groove to prevent separation of the stud and socket until said other part is axially shifted relative to said part which engages said socket, and resilient means normally acting upon one of said parts to position it relative to the other part so that one of said parts has to be shifted relative to the other part before the stud and socket can be engaged or separated.

3. A fastening device comprising a socket member having means for attachment to a support, a stud-receiving aperture therethrough for receiving the shank of a stud, a stud member comprising a stud-post having means for attachment to a support, the free end of said stud-post having a rigid hook-shaped head integral therewith, said head presenting a rearwardly facing rigid shoulder, an axially shiftable push-button element movably connected with said stud-post and having a forwardly facing rigid shouldered portion integral therewith and normally positioned diametrically opposite said rigid shoulder of said stud-post when said push-button element is in its forward position, the normal diameter of the extremity of said stud member being greater than that of said aperture of said socket member by reason of said shoulders, said forwardly facing shoulder being adapted for yielding engagement with said socket member in a plane parallel with the axis of the stud thereby to diminish the normal diameter of the extremity of said shank member to permit the stud head to enter said passage, said socket member presenting a stud-engaging wall adjacent said aperture adapted to lodge behind said rearwardly facing shoulder of said stud-post, said forwardly facing shouldered portion adapted to enter said aperture and engage said wall when said stud and socket are engaged thereby to lock them against accidental separation, and spring means adapted to maintain said push-button element in its normal forward position.

4. A fastening device comprising a socket member having means for attachment to a support, a stud-receiving aperture therethrough for receiving the shank of a stud, a stud member comprising a base having means for attachment to a support, a shank extending from said base, said shank having a rigid hook-shaped head, the inner backwardly facing surface of said hook being adapted to fixedly engage a wall provided by said socket member, axially movable means with which said head is provided, said means providing blocking means adapted to automatically yield in a plane parallel with the axis of the stud upon engagement of said socket member with said stud head and upon full engagement of said members to enter said aperture in said socket and thereby block the withdrawal of said socket member from said stud member, spring means normally to maintain said blocking means in its blocking position.

5. A fastening device comprising a socket member having means for attachment to a support, a stud-receiving aperture therethrough for receiving the shank of a stud, a stud member having attaching means for securing said stud to a support and being provided with a two-section hook-shaped head, said two-section head normally being of greater diameter than that of said aperture in said socket member, one of said sections being adapted for axial yielding engagement with said socket member to diminish said diameter of said head at the hook-shaped portion thereof, thus enabling said socket to become engaged with said stud member behind said hook-shaped head, the inner backwardly facing surface of said hook fixedly engaging a wall of said socket adjacent to said aperture and said yielding section of said stud head being adapted to enter the passage of said socket member, resume normal position and restore said greater diameter to said stud head upon the full engagement of said members, spring means normally to maintain said yielding section of the stud head in its normal position and manually operative axially slidable means adapted to operate said yielding section of said stud head, and a bevelled surface with which said yielding section is provided, said bevelled surface being adapted to slide against said wall of said socket member and through said aperture, thereby to shift said socket member to a position back of said hook shaped head to lock said stud and socket together.

6. A fastening device comprising a socket member having means for attachment to a support, a stud-receiving aperture therethrough for receiving the shank of a stud, a stud member comprising a stud-post having means for attachment to a support, an axially yielding element blocking means with which said stud member is provided, said blocking means comprising rigid shoulders with which said stud-post and said yielding element are provided thereby to normally provide said stud member with a head of greater diameter than that of said aperture in said socket, said yielding element being adapted to be operated ahead of said socket upon an attempted connecting engagement therewith of said socket member, thereby shifting the shoulder on said yielding element relative to the shoulder of the stud part to diminish said greater diameter of said stud head to permit full engagement of said fastening members, said yielding element resuming its normal position so that the shoulder of said yielding element may enter the aperture of said socket member to restore said greater diameter and thereby effectively block the withdrawal of said stud member from said socket member, spring means normally to maintain said blocking means in its normal position, said yielding element providing a press button at the outer end of said stud whereby said yielding element may be manually operated preparatory to disconnecting said members.

7. A fastening device comprising, in combination, a socket member presenting a stud-receiving aperture surrounded by a stud-engaging wall, a cooperating stud member including a hollow shank portion having an integral fixed shoulder transverse to the axis of the stud behind which a portion of said socket may engage and a resiliently pressed axially shiftable member cooperating with said shank and presenting integral means for engagement with said stud-engaging wall to lock the stud and socket together.

8. A fastening device comprising, in combination, a socket member presenting a stud-receiving aperture, a cooperating stud member including a hollow shank portion having a recess formed therein, a slot in said shank and an axially movable resiliently pressed member within said stud presenting a socket engaging portion through said slot to normally prevent engagement of the socket with the stud, said socket engaging portion operable longitudinally in said slot to permit engagement of the socket with the recess in said shank to lock said socket therewith and also to permit separation of said fastening device.

9. A fastening device comprising, in combination, a socket presenting a stud-receiving aperture, a cooperating stud having a shank portion presenting a recess for engagement with said socket, a spring-pressed button operable relative to said shank and a socket-engaging part integral with said button and longitudinally operable in a slot in said shank to permit engagement of said shank and socket, said socket-engaging part thereafter engageable with said socket to prevent separation of said fastening device, and said button manually operable to permit separation of said device.

GEORGE HENRY ELWELL.